United States Patent [19]

Van Andel et al.

[11] Patent Number: 5,004,660

[45] Date of Patent: Apr. 2, 1991

[54] MASTER DISC AND METHOD OF MANUFACTURING A MATRIX

[75] Inventors: Maarten A. Van Andel; Johannes P. J. G. Van Liempd; Josephus M. Wijn, all of Eindhoven, Netherlands

[73] Assignee: U.S. Philips Corporation, New York, N.Y.

[21] Appl. No.: 425,382

[22] Filed: Oct. 17, 1989

Related U.S. Application Data

[63] Continuation of Ser. No. 223,457, Jul. 21, 1988, abandoned.

[30] Foreign Application Priority Data

Jul. 23, 1987 [NL] Netherlands ............ 8701736

[51] Int. Cl.$^5$ ............................ G03C 1/00; G03C 3/00
[52] U.S. Cl. ........................................ 430/17; 430/14; 430/15; 430/18; 430/270; 430/271; 430/320; 430/321; 430/324; 430/326; 430/964; 430/945
[58] Field of Search ............... 430/14, 15, 17, 18, 430/270, 271, 326, 945, 321, 324, 964, 320

[56] References Cited

U.S. PATENT DOCUMENTS

| | | | |
|---|---|---|---|
| 3,884,696 | 5/1975 | Bowden et al. | 430/942 |
| 3,935,332 | 1/1976 | Poliniak et al. | 427/23 |
| 4,054,454 | 10/1987 | Himics et al. | 430/270 |
| 4,262,073 | 4/1981 | Pampalone et al. | 430/18 |
| 4,409,317 | 10/1983 | Shiraishi | 430/270 |
| 4,430,401 | 2/1984 | Wilkinson | 430/945 |
| 4,650,735 | 3/1987 | DeLaat | 430/320 |
| 4,655,876 | 4/1987 | Kawai et al. | 430/321 |
| 4,774,764 | 9/1988 | Peavey et al. | 430/323 |
| 4,861,699 | 8/1989 | Wijdenes et al. | 430/326 |

*Primary Examiner*—Charles L. Bowers, Jr.
*Assistant Examiner*—Thorl Chea
*Attorney, Agent, or Firm*—Norman N. Spain

[57] ABSTRACT

The master disc contains a substrate plate which is preferably provided with an optically detectable guide track and a recording layer of polysulphone such as poly(1-butene sulphone) to which, preferably, a colorant is added and in which an optically readable information track is provided by patterned exposure, a pit or groove being formed in the polysulphone layer. A matrix is formed by applying a metal layer to the polysulphone layer by means of an electroless deposition process and then, applying a further metal layer by means of an electrodeposition process or applying a curable synthetic resin layer together with a metal disc, after which the synthetic resin is made to cure.

9 Claims, 1 Drawing Sheet

MASTER DISC AND METHOD OF MANUFACTURING A MATRIX

This is a continuation of application Ser. No. 223,457, filed Jul. 21, 1988 abandoned.

BACKGROUND OF THE INVENTION

The invention relates to a master disc for the manufacture of matrices which in turn are used in the manufacture of optically readable information carriers, which master disc contains a substrate plate which is provided on one side with a layer of a radiation-sensitive substance in which an optically readable information track is provided.

Such a master disc is described in, for example, British Patent No. 2,128,206 (PHN 10.790) in the name of the Applicants. The layer of a radiation-sensitive substance used in the known master disc is a photoresist layer and, more in particular, a layer of a positive photoresist material. The optical information track is provided in this layer by patterned exposure of the layer, for example, by irradiation through a mask having apertures or by means of laser light which is modulated in accordance with the information to be recorded. The exposure is followed by a development step in which a developing liquid is used in which, in the case of a positive photoresist, the exposed portions of the resist layer dissolve or in which, in the case of a negative photoresist, the non-exposed portions dissolve. In general, the developing liquid is an aqueous alkaline solution which contains, for example, NaOH and $Na_4P_2O_7 \cdot 10H_2O$. After the development step a conductive layer such as a thin metal layer of Ag or Ni is applied to the photoresist layer by means of an electroless deposition process such as a vapour-deposition process, a sputtering process or a chemical plating process. A (further) metal layer such as, in particular, an Ni layer is provided on the conductive layer by electrodeposition, i.e. electrolytically, after which the master disc is separated from the metal matrix thus manufactured. Further metal copies can be made of the matrix, which are employed in the manufacture of optical information carriers.

European Patent Application No. 0224312 (PHN 11.563) describes a master disc which also contains a substrate plate, such as a glass plate, carrying a layer of a photoresist in which an information track is provided by exposure and developing. In an electroless deposition process the photoresist layer is subsequently provided with a metal layer to which a layer of a liquid, curable synthetic resin composition and metal supporting plate are applied. After the synthetic resin composition has cured by exposing it to for example UV-light, the supporting plate and the cured synthetic resin layer connected thereto are separated from the master. The supporting plate and the cured synthetic resin layer containing a copy of the information track of the master is used as a matrix in the manufacture of optically readable synthetic resin information carriers.

The master known from the above-stated literature references has the disadvantage that its manufacture comprises a great number of process steps, among others, a separate developing step.

A further important disadvantage is that the quality of the information track cannot be checked immediately. Quality control takes place at a later stage after a metal layer has been applied or the matrix has been removed from the master disc. In this process the master disc is lost due to damage to the photoresist layer.

SUMMARY OF THE INVENTION

It is an object of the invention to provide a master disc which can be manufactured more readily, and, more in particular, which does not require a developing step.

A second object is to provide a master disc in which during the writing of information in the photoresist layer by means of radiation a quality check is carried out. Consequently, it becomes possible to optimize the recording of the signal during the writing process.

These objects are achieved according to the invention with a master disc of the type described in the opening paragraph, which is characterized in that the radiation-sensitive substance is a polysulphone of the following formula

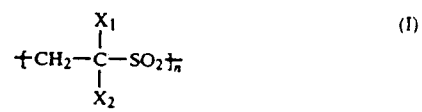

or

where $X_1$ and $X_2$ are the same or different and each represent a hydrogen atom, an alkyl group having 1 to 6 carbon atoms or an aryl group, or where they together represent one substituent which is bonded to the carbon atom of the main chain with a double bond, and where the value of n is from 50 to 5000.

The layer of polysulphone is irradiated with light according to a pattern, in particular by employing a laser light beam which is focussed to the layer and modulated in conformity with the information to be recorded. The beam is moved diametrically across the layer, whilst rotating the master disc. The polysulphone is heated in the exposed places. As a consequence of the heating or direct photochemically, the polysulphone decomposes, gaseous decomposition products being formed and a pit or a groove, dependent upon the modulation of the laser light, remaining in the polysulphone layer. In this way a spiral-shaped groove or one consisting of concentric circles can be formed in the layer of polysulphone. The pits formed by the use of pulsated laser light are arranged into an information track which may also be spiral-shaped or which may consist of concentric circles.

Figure 1:
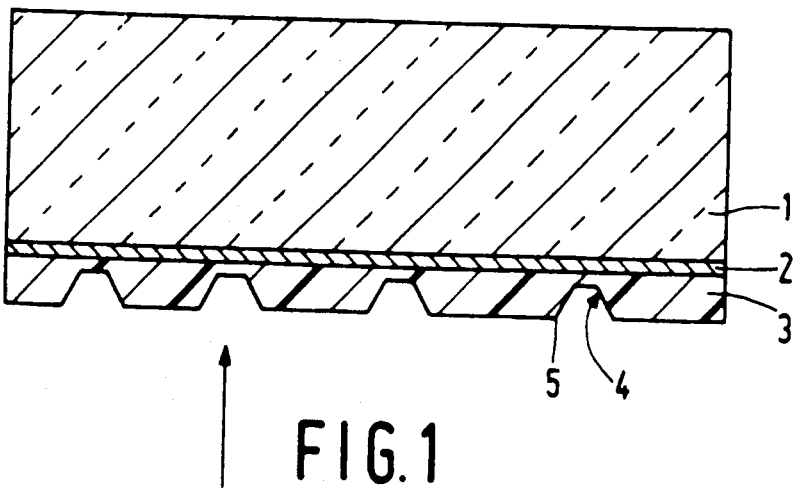
FIG. 1 is a cross-sectional view of a master disc according to the invention.

The invention will now be described in greater detail.

The substituents $x_1$ and $x_2$ in the above formulae I and II are preferably a hydrogen atom or an alkyl group having 1-6 C-atoms. The average value of n is preferably from 1000–5000.

Examples of a suitable alkyl group are, in particular, methyl, ethyl and butyl. If $x_1$ and/or $x_2$ represent an aryl group, this group is preferably a phenyl group which, if necessary, may be substituted with one or more hydroxy groups, alkyl groups having 1 to 4 carbon atoms or halogen atoms, in particular chlorine atoms.

Another suitable aryl group is a heterocyclic monoring having one or more of the hetero-atoms O, S and N. An example of such a group is a tetrazine group, i.e. a monocyclic structure having 4N atoms. The substituents $X_1$ and $X_2$ may together also represent one substituent which is double-bonded to the C-atom of the main chain. An example of such a substituent is an alkenyl group having 1-6 carbon atoms or the group $=N_2$.

Examples of suitable polysulphones are, among others, polyethene sulphone, polyacetylene sulphone, polybutene sulphone, polystyrene sulphone, poly(phenylacetylene)sulphone, poly(1-hexyn)sulphone and poly(s-tetrazine-ethene)sulphone.

In a preferred embodiment of the master the light sensitive substance is poly(1-butene sulphone). This substance decomposes upon exposure according to the following reaction:

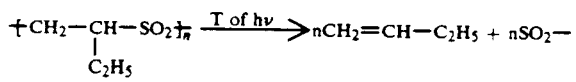

A very suitable layer thickness of the polysulphone layer is 50–500 nm. Such a layer is applied by means of a spinning process. According to this process a solution is provided in the centre of the circular substrate plate which is rotated. The solution spreads over the surface of the substrate plate and the solvent evaporates simultaneously. The desired layer thickness can be adjusted by varying the revolutions and the viscocity of the solution which is predominantly determined by the polysulphone concentration.

In a further preferred embodiment of the master according to the invention the layer of polysulphone contains a colorant. Thus, an optimum absorption of laser light in the polysulphone layer is obtained, such that heating of the layer and its decomposition take place faster and more effectively. Moreover, there is a wide choice of colorants, which makes it easy to select one whose absorption spectrum suits the emission spectrum of the laser used. A suitable laser is, for example, an Argon laser having an emission wavelength of 458, 488 and 514 nm. A suitable colorant is Orasol Yellow 3R (colour index name) which is used in a quantity of from 5 to 10% by weight of the sulphone.

In a further preferred embodiment of the master disc according to the invention, a radiation-absorbing layer is provided between the substrate plate and the polysulphone layer. The radiation-absorbing layer is, for example, a metal layer such as a layer of Au, Cr or Cu or a layer of a metal oxide or metal nitride such as $Al_2O_3$ or AlN. Upon the writing of information a direct absorption of laser light takes place in the polysulphone layer. A part of the laser light is absorbed in the absorption layer below the polysulphone layer, which leads to a local rise in temperature of the absorption layer which due to conduction or radiation transmits energy to the polysulphone layer. In this preferred embodiment the laser light absorption is also optimized, such that a faster recording of information is possible.

In yet a further preferred embodiment the substrate plate is provided on the side of the polysulphone layer with an optically detectable guide track. This track may be a continuous spiral-shaped groove or it may consist of a series of detection points which are located on a spiral-shaped path at a relatively large distance from each other. The guide track may contain information, for example, with respect to the implementation of the recording process or with respect to the location of recording. For this purpose the guide track has a so-called heading of information areas which are located alternately at a higher and a lower level, which areas are read in the reflection on the basis of phase differences. Detection of the guide track and the heading preferably takes place using laser light having a different wavelength than the laser light used in the recording process to preclude that upon detection and following of the track also changes in the polysulphone layer take place.

The use of a synthetic resin substrate permits the guide (follower) track to be directly provided in the surface of the disc during the manufacture of the disc, for example, by using a mould in an injection moulding process which has a track which is the negative of the desired track. In the case of a glass substrate the guide track is provided in a synthetic resin layer which is separately provided on the substrate. For this purpose, for example, a liquid, curable synthetic resin composition is provided on a matrix which has a track which is the negative of the desired guide track. A glass substrate plate is placed on the synthetic resin layer, said layer is cured, for example, by exposure to UV-light and the substrate plate with the cured synthetic resin layer connected thereto, which layer contains a copy of the guide track, are removed from the matrix.

The use of a guide track permits an accurate recording, while, moreover, the mastering machine can be of a more readily conceivable construction.

The invention further relates to a method of manufacturing a matrix having an optical information track, a master disc containing a layer of a polysulphone of the formula

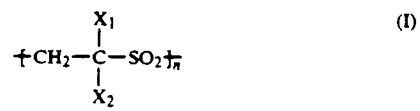

or

where $X_1$ and $X_2$ are the same or different and each represent a hydrogen atom, an alkyl group having 1 to 6 carbon atoms or an aryl group, or where they together represent one substituent which is bonded to the carbon atom of the main chain with a double bond, and where n has a value from 50 to 5000, being exposed according to a pattern, such that in the exposed places a pit or a groove is formed in the layer of polysulphone, and subsequently the surface of the polysulphone layer having said pits or grooves being provided with a metal layer in an electroless deposition process, after which it is provided with a further metal layer by electrodeposition or with a curable synthetic resin composition and a metal disc, which synthetic resin composition is cured after the metal disc is provided, and finally the master disc is removed.

Exposure to, for example, laser light may take place via a mask which is provided with apertures. It is preferable to expose the layer of polysulphone to laser light which is modulated in conformity with the data to be recorded, and, more specifically is pulsated with, for example, a pulse time from 50 nS to 3 $\mu$S. A suitable laser power is, for example, from 1-100 mW on the disc. The laser light is moved diametrically across the rotating circular master disc, and it is focussed to the polysulphone layer via an objective having a large numerical aperture, such that very small areas having a diameter of, for example, 1 $\mu$m or less are exposed and, consequently, pits of the same diametrical dimensions are formed. It is also possible to form a groove having a width of approximately 1 $\mu$m or less. A particular aspect is the shape of the pits or grooves. The pits or groove have (has) a completely flat edge. This is to be understood to mean herein that the upper surface of the pit or groove coincides with the surface of the polysulphone layer. That is to say, there is no upright edge of material about the pit or groove. Upon exposure all the material evaporates and decomposes and no condensation of decomposition products takes place on the surface of the polysulphone layer. Pits or a groove having a flat edge are also formed when the sulphone layer contains a colorant.

The pit pattern or the groove is read on the basis of reflection differences with the surroundings, a laser light beam being used which is emitted by the same laser as the one which is used for writing the information but which has been adjusted to a lower energy level (power) to avoid that again, unintentional, pits or a groove are (is) formed. It is also possible to use a different laser for reading, such as a He-Ne laser of which preferably the emission wavelength differs from the absorption wavelength of the colorant used. Preferably, the read-laser light is focussed to the polysulphone layer via the same objective as used for the write-laser light. As soon as a signal bit (pit or groove portion) is written in, it can be checked if the signal has been optimally recorded by means of the read-laser light. Important parameters in this connection, such as the signal to noise ratio, cross-talk, modulation depth and intermodulation can be established immediately. Dependent upon the result the writing process can be adjusted.

The surface of the polysulphone layer which contains a pit pattern or grooves is provided with a metal layer by means of an electroless deposition process according to a method which is known per se, for example, by means of vapour-deposition, sputtering or by means of a chemical plating process. To continue the process a choice can be made between two variants. According to the first variant a further metal layer, for example an Ni layer, is electrodeposited on the first metal layer, such as an Ag or Ni layer, which has been provided in an electroless deposition process. After they are separated from the master disc a metal matrix is obtained which contains a copy of the information track of the master. This matrix which is also called father disc can be used in the manufacture of synthetic resin information carriers, in which, for example, an injection moulding method or a compression moulding method is used. The synthetic resin information carrier is provided with a reflection layer on the side of the information track. Such a synthetic resin information carrier is known by the trade name Compact Disc R and refers to a disc having optically readable audio information, or by the trade name Laser Vision R in which case it contains optically readable video information. The synthetic resin information carrier may also be provided with a recording layer on the side of the information track, such that an optical recording element is obtained. In such an element the optically readable information track is mostly formed by a groove which is also called servo track. The groove is read optically and it determines, for example, the position of the recording bits in the recording layer.

The above-mentioned metal father disc can also be used in the production of a matrix family, in which one or more mother discs are made of the father disc in an electrodeposition process, from which mother discs one or more son discs (stampers) are replicated.

The second variant consists in that the metal layer which has been provided by an electroless deposition process is provided with a liquid, curable synthetic resin composition, such as a light-curable acrylate composition, to which a metal disc is provided, after which the synthetic resin composition is cured and the master disc, i.e. the substrate including the polysulphone layer is removed. The matrix obtained consists of a metal disc which is provided with a cured synthetic resin layer, the synthetic resin layer containing an optically readable information track. This matrix can be used directly in an injection moulding process or compression moulding process for the manufacture of synthetic resin information carriers as described above.

The invention will now be explained in more detail by means of an exemplary embodiment and with reference to the drawing Reference numeral 1 in FIG. 1 denotes a disc-shaped glass substrate plate having a thickness of 6 mm. On one side the plate is provided with a light-absorbing layer, in this case a Cr-Au layer 2 having a thickness of b 60 nm. A layer 3 of poly(1-butene sulfphone) having a thickness of 120 nm if applied to layer 2. This has been carried out by means of a so-called spinning process in which a solution of poly(1-butene sulphone) in an organic solvent, such as methyl cellasolve acetate, is deposited in the centre of the substrate plate 1. The concentration of poly(1-butene sulphone) in the solution amounts to 30 g/l. Subsequently, the substrate plate 1 is rotated at a frequency which increases to 25 Herz. The solution then spreads over the entire free surface of the layer 2, whilst the solvent selected evaporates in the air, such that a solid layer of poly(1-butene sulphone) having the above-said thickness of 120 nm is obtained.

The layer 3 is exposed to pulsated laser light in the direction indicated by the arrow, and the substrate plate 1 is rotated at a rate of 5 Herz. The pulse time is 0.7 $\mu$s. The laser power is 20 mW. The beam of laser light passes through the polysulphone layer 3 and is partly absorbed by the absorption layer 2 and the unabsorbed plate is reflected, the reflected beam again passing through the layer 3. In said layer absorption takes place again. Finally, the beam leaves the master disc. Due to the light absorption in the layers 2 and 3 they are locally heated to a temperature of 1000° C. and higher. The heating of layer 3 is caused to a substantial extent by heat transfer from layer 2 to layer 3. Owing to the heating and also due to photochemical reactions the layer 3 decomposes in the exposed places and a well-defined pit 4 is formed whose edge 5 is completely flat and coincides with the surface of layer 3. Immediately after writing a bit (signal) in the form of a pit, the signal quality is checked by means of, for example, weak laser light which is also focussed to layer 3 of the master disc in the direction indicated by an arrow. The reading operation is carried out on the basis of differences in reflected light coming from the layer at the location of a pit and at the location of the surroundings of a pit. Important parameters such as signal to noise ratio, cross-talk and intermodulation are determined. If desired, the writing process is adjusted after this check, for example, by adapting the position of the objective or the laser power. The use of a polysulphone layer as described above leads to pits of excellent quality and having a readily reproducible geometry.

Instead of the above-described poly(1-butene sulphone) also other polyalkene sulphones or polyacetylene sulphones, such as those shown in formula 1, can be used, which give the same favourable results.

Figure 2:
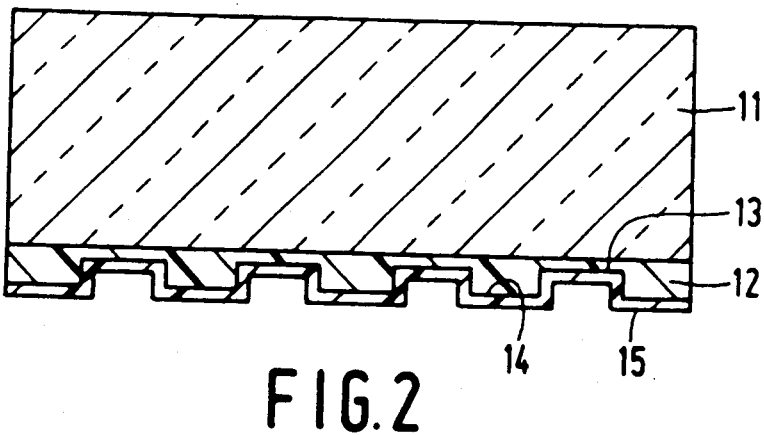
FIG. 2 is a cross-sectional view of a different embodiment of a master disc according to the invention and FIG. 3 is a cross-sectional view of a master disc and a matrix during the manufacture of the matrix according to the invention.

Reference numeral 11 in FIG. 2 denotes a glass substrate plate which is provided on one side with a light-curable synthetic resin layer 12 on the basis of acrylates. As has been described hereinbefore an optically detectable guide track in the form of a spiral-shaped groove 13 has been provided in the layer 12 by means of a matrix. The elevated portions 14 of layer 12 which are present between the spiral turns are called lands. A layer of polystyrene sulphone 15 containing 7% by weight of the colorant Orasol Yellow 3R is applied to the layer 12. The guide track is read in an air incident mode using red laser light. Subsequently, blue laser light ($\lambda = \pm 450$ nm) is used to record the desired information in the form of pits having a flat edge as described hereinbefore with respect to FIG. 1. This recording operation may be carried out either in the groove portions 13 or in the lands 14 of the layer 15.

Figure 3:
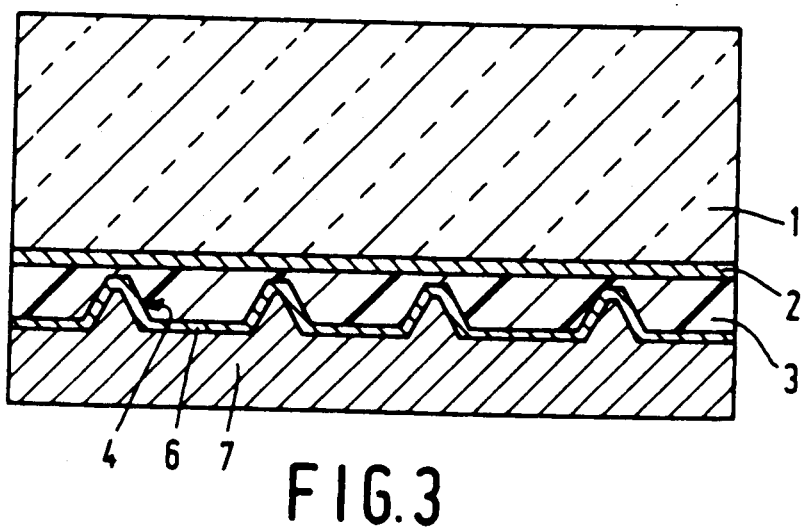

A copy (matrix) is made of the master disc shown in FIG. 1; this is illustrated by means of FIG. 3. In FIG. 3 corresponding parts are given the same reference numerals as in FIG. 1.

The layer 3 having pits 4 is provided with a metal layer, in particular a layer 6 of Ag or Ni, by means of an electroless deposition process such as a sputtering process, a vapour-deposition process or a chemical plating process. A thicker metal layer 7, in particular a layer of Ni, is applied thereto by means of an electrodeposition process, after which the master disc is removed. The metal (Ni) matrix thus obtained is provided on one side with an information track which is the negative of the master disc. Further metal copies (mother matrix, son matrix) can be made of this father matrix by means of an electrodeposition process. By means of the father matrix and the son matrix positive impressions can be made in synthetic resin material by means of, for example, an injection moulding process or a compression moulding process. These synthetic resin information carriers may be provided with a metal layer, such as a vapour-deposited Al layer on the side of the information track, optically readable audio discs (Compact Disc R) or video discs (Laser Vision R) being obtained, or they may be provided with an optical recording layer, so that recording elements are obtained.

What is claimed is:

1. A master disc for the manufacture of matrices which in turn are used in the manufacture of optical information carriers, said master disc comprising a substrate plate provided on one side with a layer of a radiation-sensitive substance in which an optically readable information track formed of pits or grooves is provided, said radiation-sensitive substance being a polysulphone which corresponds to the formula

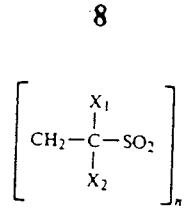

or

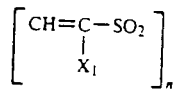

where $X_1$ and $X_2$ are equal or unequal and each represent a hydrogen atom, an alkyl group having 1 to 6 carbon atoms or an aryl group, or where they together represent one substituent, which is bonded to the carbon atom of the main chain with a double bond, and where n has a value from 50 to 5000 and said layer of said radiation-sensitive substance is provided with a radiation-absorbing colorant.

2. A master disc as claimed in claim 1, wherein light-sensitive substance is poly(1-butene sulphone).

3. A master disc as claimed in claim 1, wherein the layer thickness of the polysulphone layer is from 50 to 500 nm.

4. A master disc as claimed in claim 1, wherein the substrate plate is provided with an optically detectable follower track on the side of the polysulphone layer.

5. A master disc as claimed in claim 2, wherein the light-sensitive substance is poly(1-butene sulphone).

6. A master disc for the manufacture of matrices which in turn are used in the manufacture of optical information carriers, said master disc comprising a substrate plate provided on one side with a layer of a radiation-sensitive substance in which an optically readable information track formed of pits or grooves is provided, said radiation-sensitive substance being a polysulphone which corresponds to the formula

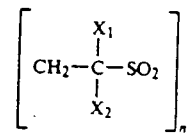

or

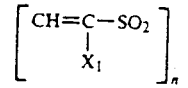

where $X_1$ and $X_2$ are equal or unequal and each represent a hydrogen atom, an alkyl group having 1 to 6 carbon atoms or an aryl group, or where they together represent one substituent, which is bonded to the carbon atom of the main chain with a double bond, and where n has a value from 50 to 5000 and a radiation-absorbing layer is provided between the substrate plate and the layer of the radiation-sensitive substance.

7. The master disc as claimed in claim 6, wherein the light-sensitive substance is poly(1-butene sulphone).

8. A master disc as claimed in claim 6, wherein the layer thickness of the polysulphone layer is from to 50 500 nm.

9. A master disc as claimed in claim 6, wherein the substrate plate is provided with an optically detectable follower track on the side of the polysulphone layer.

* * * * *